United States Patent Office 2,934,529
Patented Apr. 26, 1960

2,934,529

PROCESS FOR POLYMERIZING VINYL CHLORIDE IN AN AQUEOUS EMULSION

Christiaan Pieter van Dijk, Franciscus Johannes Fredericus van der Plas, and Adrianus de Keizer, Amsterdam, Netherlands, assignors to Shell Oil Company, a corporation of Delaware No Drawing. Application August 7, 1953
Serial No. 373,062

Claims priority, application Netherlands August 14, 1952

2 Claims. (Cl. 260—92.8)

This invention relates to a process for polymerizing unsaturated organic compounds. More particularly, the invention relates to an improved process for polymerizing ethylenically unsaturated organic compounds in an aqueous emulsion.

Specifically, the invention provides a new aqueous emulsion polymerization process that employs a very low concentration of emulsifying agent and requires only a small amount of stirring. These improvements are obtained according to the present invention by effecting polymerization of the ethylenically unsaturated compound in an aqueous emulsion in a reaction zone wherein the components are being continuously added and a portion of the reaction mixture continuously withdrawn, said addition and withdrawal being so regulated that the composition of the reaction mixture remains substantially constant and uniform throughout the reaction zone, adding the said unsaturated compound to the reaction mixture as a very fine stable emulsion containing a small amount of emulsifying agent, e.g., less than 0.12 equivalent per 1000 grams of monomer, and maintaining the ratio of the concentration of monomer and polymer in the reaction mixture between 0.12 and 0.30.

It is known that substantially water-insoluble ethylenically unsaturated monomers, such as vinyl chloride, may be polymerized in an aqueous emulsion. The general method for accomplishing this type of polymerization comprises adding the monomer batchwise to an aqueous solution of the emulsifier, stirring the mixture to form an emulsion and then heating the mixture at the desired polymerizing temperature. In this process the quantity of emulsifier required depends on the desired degree of distribution of the monomer, and to obtain a satisfactory emulsion with most monomers, relatively large amounts, e.g., about 5% by weight, of the emulsifier are required. The presence of such a large amount of agent is undesirable as it increases the problem of coagulation of the polymer latex and gives low quality products. In some cases, it may be possible to reduce the amount of the emulsifier to a lower limit, e.g., to about 3% by weight, by greatly increasing the rate of agitation, but this is unsatisfactory as the increased agitation causes large formation of polymer deposits on the walls of the reactor and this in turn interferes with the mechanical operation of the process.

It is an object of the invention, therefore, to provide an improved process for polymerizing unsaturated organic compounds in an aqueous emulsion. It is a further object to provide an aqueous emulsion polymerization process that utilizes a low concentration of emulsifying agent. It is a further object to provide an aqueous emulsion polymerization process that requires only a small amount of stirring. It is a further object to provide an improved aqueous emulsion polymerization process that is particularly suited for use in large reaction vessels. It is a further object to provide an improved aqueous emulsion process that provides polymers of high quality. It is a further object to provide an aqueous emulsion process that can be operated without the formation of polymer deposits on the walls of the reactor. It is a further object to provide an improved continuous aqueous emulsion polymerization process for ethylenically unsaturated monomers, such as vinyl chloride. Other objects and advantages of the invention will be apparent from the following detailed description thereof.

It has now been discovered that these and other objects may be accomplished by the process of the invention which comprises effecting polymerization of the ethylenically unsaturated compound in an aqueous emulsion in a reaction zone wherein the components are being continuously added and a portion of the reaction mixture continuously withdrawn, said addition and withdrawl being so regulated that the composition of the reaction mixture remains substantially constant and uniform throughout the reaction zone, adding the said unsaturated compound to the reaction mixture as a very fine stable emulsion containing a small amount of emulsifying agent, e.g., less than 0.12 equivalent per 1000 grams of unsaturated compound, and maintaining the ratio of the concentrations of monomer and polymer in the reaction mixture between 0.12 and 0.30. It has been found that by the use of this unique method one can maintain a fine dispersion of the monomer in the reaction zone with a surprisingly small quantity of emulsifier and the resulting polymers have excellent properties. That one could obtain a fine emulsion and superior products with such a small amount of agent was indeed surprising in view of the above-described theory employed with the batchwise process that the smaller the state of subdivision, the greater should be the amount of the emulsifying agent.

It has also been found that the stirring normally employed for dissipation of heat is quite sufficient to maintain the emulsion in the process of the invention, and higher rates of stirring as required in the usual emulsion processes can be avoided. In general, only a slight movement is needed to dissipate the heat and homogenize the mixture used in the present process. As excessive stirring has been avoided, there is consequently no deposition of polymer such as occurs in other processes as a result of the shearing stresses created by the necessary agitation.

The advantages of the process of the invention are particularly evident when large reactors are employed. Coarse, unstable emulsions such as those which are applied in the above-described known batchwise emulsion process require vigorous stirring whenever larger reactors are used. To prevent the more vigorous movement from being attended by a deposition of polymer, the concentration of emulsifier must also be increased. Coarse emulsions, therefore, require higher concentrations of emulsions as the reaction spaces become larger. With the process of the present invention, however, there is no objection to increasing the size of the reaction space as the same fine dispersion of monomer can be obtained by the use of the small quantity of emulsifying agent in the large reactors as well as with the small reactors. The process of the invention is, therefore, particularly important for use in large reactors, and particularly for those having a volume exceeding 0.5 cu. m.

The fine stable emulsion of monomer to be added to the reaction zone according to the process of the invention is an aqueous emulsion in which the monomer is present in the form of finely-divided droplets, a greater part of said droplets preferably having a maximum diameter of 0.02 mm., and more preferably a diameter between 0.01 mm. and 0.005 mm.

The stable emulsion of monomer added to the reaction mixture also contains one or more emulsifiers in a total quantity of less than 0.12 gram equivalent per 1000 grams of substance to be polymerized. A gram equivalent is the number of grams which is equal to the molecular weight divided by the number of positive (or negative) elementary electric charges formed on ionization of a molecule. Preferably the amount of emulsifier will be below 0.08 gram equivalent per 1,000 grams of monomer, and more preferably from 0.03 to 0.08 gram equivalent per 1,000 grams of monomer.

Emulsifying agents used in the preparation of the stable monomer emulsions may be any of the known ionic or non-ionic type emulsifying materials. Suitable materials include the soaps like sodium or potassium myristate, laurate, palmitate, oleate, stearate, rosinate, or hydroabietate; or alkali metal alkyl or alkenyl sulfates or sulfonates, including sodium or potassium lauryl sulfate, cetyl sulfate, oleyl sulfonate, stearyl sulfonate, sulfonated Turkey red oil, sulfonated mineral oils, sodium alkyl naphthalene sulfonate, sodium arylalkyl polyether sulfonate, etc., as well as ammonium salts of such sulfates or sulfonates, cetyl trimethyl ammonium bromide, cetyl pyridinium bromide, sorbitol monolaureate, sorbitol mono-oleate, polyoxyalkylene ethers of partial esters of sorbitol with lauric, palmitic, stearic or oleic acid. Particularly suited for the invention are the salts of alkyl sulfonates wherein the alkyl group contains about 10 to 20 carbon atoms. Such products are obtainable by known methods of subjecting paraffinic or cyclo paraffinic hydrocarbon mixtures which are substantially free from aromatic hydrocarbons to reaction with sulfur dioxide and chlorine and neutralizing the obtained sulfochloride with a base such as sodium or potassium hydroxide. Although any emulsifying agent is suitable for preparation of the emulsions, proper choice is of course necessary when particular conditions of polymerization are desired. Thus, where the polymerization is effected with an acidic emulsion, it is necessary that the emulsifying agent be one which is stable in the presence of acid, such as is the case of the salts of alkyl sulfonates.

The stable emulsion of monomer may also contain a polymerization catalyst, but, as indicated hereinafter, this component may be added to the reaction mixture separately if desired. The catalysts generally employed in the reaction include the peroxy polymerization catalysts and more preferably the water-soluble peroxy catalysts. Suitable catalysts include hydrogen peroxide, sodium or potassium persulfate, percarbonate or perborate; peracetic acid, or para-tertiary butyl hydroperoxide. Other catalysts, such as benzoyl peroxide, acetyl peroxide, acetyl benzoyl peroxide, lauryl peroxide, and acetone peroxide can also be used in combination with the aforedescribed water-soluble catalysts. The amount of the catalyst added will vary over a wide range but in most cases will vary from 0.01% to 3% by weight of monomer and more preferably from 0.1% to 2% by weight of monomer.

The monomer emulsion may be acid, neutral or alkaline. In the case of catalysts, such as hydrogen peroxide, it is sometimes desirable to employ emulsions of pH 3 to 5, while in other cases it may be desirable to use a pH of 7 to 13. Adjusters, such as sodium carbonate, sodium bicarbonate, trisodium phosphate, and the like, may be added to the emulsion as necessary to maintain the desired pH.

The stable emulsion of monomers may also contain various quantities of other components, such as polymerization accelerators, dyes, pigments, and the like. These components may also be added to the reaction mixture separately rather than with the monomer emulsion as desired.

The stable emulsion of monomer to be added to the reaction mixture may be prepared by any suitable method. They may be prepared, for example, by merely stirring the monomer together with the water solution containing the emulsifying agent and other desired ingredients.

The emulsion is preferably prepared, however, by first mixing the monomer with a suitable quantity of a solution of not too low a concentration of emulsifier in water to form a jelly-like mass and then diluting the latter. This process is very effective as a very fine emulsion can be easily obtained with a minimum consumption of energy. The said jelly-like mass as characterized, in addition to high viscosity, by a typical picture when examined microscopically; the main mass of the monomer is invisible and only reappears when diluted as separate droplets.

The aqueous solution of emulsifier which is admixed with the monomer in order to obtain the jelly, contains an appreciable proportion of emulsifier. For this purpose, the solution contains at least about 5% by weight, but preferably higher concentrations are used such as from 10% to 35% by weight. The optimum concentration will vary to some extent as determined by the particular emulsifying agent and the nature of the other compounds dissolved in the water phase as well as the particular monomer being emulsified.

In forming the jelly, the monomer is mixed with an appreciable proportion of the above-described aqueous solution of emulsifier, but the proportions are such that the monomer predominates in the resulting mixture. Generally about 5% to 20% of the solution of emulsifier based on the weight of the monomer is employed.

The dilution of the jelly or gelatinous mass requires, for best results, an arrangement whereby dilution is effected regularly with substantially uniform addition of the diluting water to the agitated mass. The addition of water to the mixture so that local excesses occur are undesirable since it has been found that at times lumps of the jelly tend to remain in the aqueous phase rather than a uniformly dispersed emulsion being obtained. The addition of the water may be effected in any suitable manner whereby vigorous agitation of the mass is obtained such as with the aid of a centrifugal pump or turbo-mixer. In those cases where it is desired that the dilution be carried out in continuous manner, it has been found that injection of the water from jet or jets, preferably counter-current to the stream is suitable. The care in having uniformity of dilution of the jelly need not be continued after the water has become the continuous phase and the monomer assumes a distinct dispersed phase in the emulsion. After this extent of dilution has occurred, addition of further water may be made without observing special precautions for uniformity. In the most preferred embodiment, the dilution is effected uniformly with vigorous agitation until the system contains a continuous aqueous phase and a dispersed monomer phase after which further dilution is effected by simple admixture of the water needed to give the desired monomer concentration. In most cases, the dilution is continued until there is between 3 to 40 parts of monomer per 100 parts of water, and more preferably from 3 to 20 parts of monomer per 100 parts of water. The exact amount of dilution will depend upon that needed to obtain a feed mixture that can be used to obtain a steady state in the reaction zone and this can be determined for each individual case.

The dilution may be accomplished by merely adding water or by adding an aqueous solution containing the other components to be added to the reaction zone, such as the catalyst, pH adjuster, and the like. These components can also be added separately to the emulsion after the jelly has been diluted to the desired amount.

The preparation of the jellied mixtures, as well as the formation of the monomer emulsions therefrom, is effected without heating. Accordingly, any reasonable normal temperature is suitable, such as from about 10° C. to 30° C. In those cases where volatile monomers are used it will be necessary to apply superatmospheric pressures in order to maintain the monomer in the liquid phase, as is the case, for example, with vinyl chloride.

It is also an essential feature of the process of the invention that the concentrations of monomer and polymer in the reaction mixture be kept between 0.12 and 0.30. If alkyl or alkylene sulfates or sulfonates are used as emulsifying agents it is preferred to maintain the ratio of concentrations of monomer and polymer between 0.15 and 0.30. This ratio of concentrations can be established by proper selection of the residence time of the reaction mixture in the reactor. The residence time is equal to the volume of the reactor divided by the total rate of supply of all ingredients together.

When the process is started, the reaction space preferably contains an old suspension obtained by a previous operation of the process. However, if this is not available, one may employ an aqueous solution of substantially the same composition as that of the water phase of the monomer emulsion. In starting out with this type of solution it is sometimes desirable to employ a slightly larger amount of emulsifying agent at the start and then cut it back as soon as the process goes on full stream.

The polymerization of the monomer in the reaction zone is accomplished by heating the reaction mixture to a polymerization temperature. Temperatures employed will vary with the particular catalyst selected, monomer, etc., but in most cases will vary from about 45° C. to 90° C., and more preferably from 50° C. to 80° C. Pressures employed should be sufficient to keep the aqueous emulsion from boiling at the selected temperature and should be sufficient to maintain the monomer in the liquid state. When operating at the above-noted preferred polymerization temperatures and the normally liquid monomers, ordinary atmospheric pressures are generally preferred. When utilizing volatile monomers, such as vinyl chloride at the preferred temperatures, it is generally preferred to employ superatmospheric pressures, such as of the order of 1 to 5 atmospheres.

After the polymerization has started, a portion of the reaction mixture containing the polymer is then withdrawn and the rate of addition of the emulsion of monomer and the rate of withdrawal of the portion of the reaction mixture adjusted so as to keep the concentration of all of the components substantially constant and uniform. This is preferably accomplished by setting the addition of emulsion at a certain rate and then regulating the rate of withdrawal so as to maintain a certain specific gravity in the said reaction mixture.

The residence time of the reaction mixture in the reactor should be such that the ratio of concentrations of monomer and polymer in the reaction mixture is kept between 0.12 and 0.30. As indicated above, the required residence period can be determined from the volume of the reactor and the total rate of supply of all ingredients together.

As indicated above, the reaction mixture is stirred as needed for dispersion of the heat of reaction. In most instances stirring at the rate of 20 to 60 revolutions per minute should be sufficient for this purpose.

The polymers may be recovered from the withdrawn portion by any suitable means, such as coagulation by freezing, addition of coagulating agents as acid, alcohol, salt, and the like, and mixtures thereof.

The apparatus used in the process of the invention may be of any suitable construction as long as it provides suitable means for the addition of the monomer emulsion, means for withdrawing a portion of the reaction mixture and means for application of heat. Conventional glass or enamelled cylindrical reactors used for the known emulsion methods have proved to be satisfactory.

The process of the invention may be used to homopolymerize or copolymerize any substantially water-insoluble ethylenically unsaturated organic compound. The expression "substantially water-insoluble" as used throughout the specification and claims in relation to the monomer to be polymerized, refers to those monomers which have at least some solubility in water but still have so little solubility as to be regarded as being relatively water-insoluble. Preferably, the monomers have a solubility in water at room temperature of from 0.1 to 20 parts per 100 parts of water. Particularly preferred monomers are those having a solubility of from 0.1 part to 14 parts per 100 parts of water.

The expression "ethylenically unsaturated," as used throughout the specification and claims, refers to those monomers possessing one or more polymerizable ethylenic groups in their molecule. Examples of such monomers include ethylene, maleic acid esters, tetrahaloethylene, butadiene-1,3, styrene, alpha-methyl styrene, vinyl phenol; esters of unsaturated acids, such as methyl acrylate, butyl acrylate, cyclohexyl 3-butenoate, hexyl acrylate, octyl acrylate, methyl methacrylate, propyl methacrylate; the vinylidene halides, such as vinylidene chloride and vinylidene bromide; the vinyl esters of inorganic acids, such as vinyl chloride and vinyl bromide; the unsaturated nitriles, such as methacrylonitrile and acrylonitrile; the vinyl esters of monocarboxylic acids, such as vinyl acetate, vinyl caproate, vinyl chloroacetate, vinyl benzoate, and vinyl valerate; the vinyl esters of polycarboxylic acids, such as divinyl succinate, divinyl adipate, vinyl allyl phthalate, diallyl phthalate; the vinyl esters of the unsaturated acids, such as vinyl acrylate, vinyl crotonate, and vinyl methacrylate; the vinyl ethers, such as vinyl ethyl ether, vinyl butyl ether; and vinyl ketones, such as vinyl hexyl ketone, and vinyl octyl ketone.

Preferred monomers to be polymerized or copolymerized comprise the vinylidene monomers containing a polymerizable $CH_2=C=$ group and no other polymerizable group, such as vinyl chloride, vinylidene chloride, vinyl butyrate, ethyl acrylate, styrene, methyl-styrene, allyl acetate, allyl butyrate, acrylonitrile, methacrylonitrile, isobutylene, and the like. Especially preferred are those monomers having a molecular weight below about 225.

Of special interest, particularly because of the fine quality of the polymers that may be prepared therefrom by the process of the invention, are vinyl chloride and copolymerizable mixtures thereof with monomers containing a $CH_2=C=$, and preferably an unsaturated ester, such as vinyl acetate, methyl methacrylate and ethyl acrylate, an unsaturated nitrile, as acrylonitrile and methacrylonitrile, and vinylidene chloride. The amount of the above-noted dissimilar monomers in the mixture with vinyl chloride preferably does not exceed 25% by weight.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

*Example 1*

(a) In this experiment, the polymerization was carried out in an autoclave with a cylindrical glass inner pot (2 liters) provided with a concentrically fitted glass stirrer. The inner diameter of the inner pot was 132 mm.; the stirrer had 6 flat blades of 40 x 15 mm. which were attached with their shortest side to the shaft at an angle of 45°.

1.5 liters of a 20% suspension of polyvinyl chloride was introduced into this autoclave. The water phase of this suspension contained 0.25% of $K_2S_2O_8$, 0.25% of $NaHCO_3$ and 0.94% of sodium mersolate.

An emulsion of vinyl chloride was prepared in the following manner. 30 parts of sodium mersolate was dissolved in 135 parts of water, 1000 parts of liquid vinyl chloride was added to this solution in a closed vessel while stirring continuously. The jelly-like mass that resulted was then gradually diluted with a solution of 8 parts of $K_2S_2O_8$ and 8 parts of $NaHCO_3$ in 3020 parts of water to form a very stable emulsion.

The contents of the autoclave were raised to 45° C.

and the speed of the stirring device was increased to 60 revolutions per minute. The emulsion was then gradually introduced into the autoclave, while the specific gravity of the reaction mixture in the autoclave was kept constant at 1.067 by simultaneous discharge.

The discharged suspension was found to contain 20 parts of poly(vinyl chloride) and 5 parts of monomer vinyl chloride (ratio of monomer to polymer of .25) to 80 parts of water phase. The rate of polymerization amounted from 70 to 80 grams per liter and per hour. The viscosity of a 0.5 percent solution of the polymer in cyclohexanone amounted to 3.40 centipoises at 25° C. No polymer deposits formed on the walls of the reactor.

(b) For purposes of comparison an experiment was carried out wherein instead of a prepared emulsion, vinyl chloride and water phase were introduced separately into the autoclave. The composition of the water phase, the rate of supply of water phase and monomer, the rate of discharge of the reaction mixture, the temperature and the rate of stirring were as in the above experiment. The viscosity of a 0.5 percent solution of the polymer in cyclohexanone formed in this case amounted to only 3.25 centipoises at 25° C. This value points to a lower average molecular weight than in the case of the product of the first experiment.

By stirring more vigorously, it was possible to raise the viscosity index of the product from 3.25 to 3.40 centipoises as in the first experiment. This time there was a high degree of polymer deposit in the autoclave.

*Example II*

This example illustrates polymerization in a large reaction vessel. In this case, the polymerization was carried out in a cylindrical enamelled reactor with a content of 1.8 cu. m. fitted with a U-shaped stirrer. The inner diameter of the reactor was 1.30 m.; the radial width of the stirrer was 8 cm.; the stirrer moved at a distance of 1 cm. from the wall.

400 liters of a solution having the same composition as the water phase of the emulsion to be applied were introduced into this reactor. This solution (pH of about 8) contained 0.25% of $K_2S_2O_8$, 0.25% of $NaHCO_3$ and 0.95% of sodium mersolate.

An emulsion of vinyl chloride was prepared as described in Example I. In this case, however, the emulsion to be added was prepared in a continuous manner.

The contents of the reactor were heated to 45° C. and the stirring device was driven at a speed of 30 revolutions per minute. In the course of a few hours, 1000 liters of emulsion of vinyl chloride was introduced into the autoclave. The supply of emulsion was then continued, but the volume of the dispersion in the reactor was kept constant by the simultaneous discharge of part of the reaction mixture. Supply and discharge were regulated in such a way that the specific gravity of the dispersion obtained a value of 1.067 and maintained it. The temperature was maintained at 45° C. The ratio of concentrations of monomer and polymer was always between 0.12 and 0.30.

The viscosity of a 0.5 percent solution of the polymer formed in hexanone amounted to 3.40 centipoises at 25° C. There was no deposition of polymer.

Similar superior results may be obtained by replacing the vinyl chloride in the above-described process with each of the following: vinylidene chloride, mixture of 80 parts vinyl chloride and 20 parts vinylidene chloride, and styrene.

We claim as our invention:

1. A continuous process for polymerizing vinyl chloride in an aqueous emulsion which comprises continuously adding a stable aqueous emulsion containing finely-divided droplets of the said vinyl chloride, a greater part of said droplets having a maximum diameter of 0.02 mm., an emulsifying agent selected from the group consisting of an alkali metal alkyl sulfate, alkali metal alkyl sulfonate, alkali metal alkenyl sulfate and alkali metal alkenyl sulfonate in an amount of 0.01 to 0.08 gram equivalent per 1000 grams of vinyl chloride, and a peroxy polymerization catalyst, to an aqueous emulsion contained in a reaction zone and containing an emulsifying agent selected from the group consisting of an alkali metal alkyl sulfate, alkali metal alkyl sulfonate, alkali metal alkenyl sulfate and alkali metal alkenyl sulfonate, and a peroxy polymerization catalyst, the proportions of the emulsifying agent, peroxy polymerization catalyst and water in the emulsion contained in said reaction zone being substantially the same as those in the stable aqueous emulsion being added, and being maintained at a polymerizing temperature, continuously withdrawing a portion of the mixture in the reaction zone, the addition and withdrawal being so regulated as to maintain the concentration of all components substantially constant and uniform throughout the reaction mixture, and maintaining the ratio of concentrations of monomer to polymer in the reaction mixture between 0.12 and 0.30, said stable emulsion added to the aqueous emulsion being prepared by mixing the vinyl chloride with 5% to 20% by weight of an aqueous solution containing 5% to 35% by weight of the emulsifying agent, and subsequently mixing the resulting jellied mixture with sufficient water and vigorous agitation to form an aqueous emulsion containing 3 to 40 parts of vinyl chloride per 100 parts of water with water as the continuous phase.

2. The process as defined in claim 1 wherein the temperature varies from 30° C. to 90° C.

References Cited in the file of this patent

UNITED STATES PATENTS

| | | |
|---|---|---|
| 2,420,330 | Shriver et al. | May 13, 1947 |
| 2,496,384 | De Nie | Feb. 7, 1950 |
| 2,520,959 | Powers | Sept. 5, 1950 |
| 2,579,908 | Davison | Dec. 25, 1951 |
| 2,587,562 | Wilson | Feb. 19, 1952 |